UNITED STATES PATENT OFFICE.

JULIUS BOETTNER AND THEODORE DICKE, OF HOBOKEN, NEW JERSEY, ASSIGNORS OF ONE-THIRD TO JULIUS SCHWENCKE, OF NEW YORK, N. Y.

SENSITIZED PHOTOGRAPHIC PAPER.

SPECIFICATION forming part of Letters Patent No. 557,047, dated March 24, 1896.

Original application filed October 29, 1892, Serial No. 450,381. Divided and this application filed March 24, 1893. Serial No. 467,413. (No specimens.)

*To all whom it may concern:*

Be it known that we, JULIUS BOETTNER and THEODORE DICKE, citizens of the United States, residing at Hoboken, in the county of Hudson and State of New Jersey, have invented certain new and useful Improvements in Processes of Preparing Paper; and we do hereby declare the following to be a full, clear, and exact description of the invention, such as will enable others skilled in the art to which it appertains to make and use the same.

This invention is a process of preparing paper for making black prints from tracings, drawings, photographs, or any design that will cast a shadow when exposed to light, as described in our pending case, Serial No. 450,381, filed October 29, 1892, of which this is a divisional case. The advantage of this process is that it will give a positive and direct sun-print upon exposure to light and subsequent development by washing in water alone.

In preparing our paper we coat it with gallic or pyrogallic acid and ferric chlorid or other ferric salt combined with tartaric, citric, or other vegetable acid.

In carrying out our invention a paper suitable for the pupose is preferably coated with a solution containing gallic or pyrogallic acid, ferric chlorid or other ferric salt, combined with tartaric, citric, or other vegetable acid, which may be thickened with a size and dried.

As above described, we apply our chemicals so as to form a coating upon the paper; but the chemicals may be allowed to permeate the paper and still yield a good result. When, however, the chemicals permeate the paper, the background of the finished copy is not so clear and good, and for that reason we prefer to use the chemicals as a coating upon the paper. After the paper is prepared it must, of course, be kept protected from the light until it is used.

We have employed many different proportions between the various chemicals used, and the proportions of the different salts and the amount of solution used may vary considerably without departing from our invention; but we have found the following to be suitable: We add two ounces of ferric chlorid, two ounces of tartaric acid, and one ounce of gallic acid to about eight ounces of water and boil, after which the solution is cooled and filtered. To the filtered solution we add one ounce of gelatin dissolved in eight ounces of water. This solution will be dark colored; but the paper treated with it will be dark yellow when dried. We apply two ounces of the solution per square yard of paper and dry the paper.

When the paper is prepared by hand, there is more waste of the solutions than when prepared in a suitable machine. With proper machinery the consumption of solutions is less than two ounces per square yard of paper treated.

To employ our paper in copying a tracing, for instance, the prepared paper is spread out and the tracing placed smoothly over the coated surface. This is best done on a suitable backing and the whole inclosed in a frame with a glass front. The coated surface of the paper is then exposed to the action of the sunlight for a length of time, depending upon the brightness of the sun. By this exposure to the sun chemical action takes place in the parts of the paper that are not protected by the dark portions of the tracing, so that the coating can be dissolved in water, leaving the paper light colored, while the portions of the paper protected by the dark parts of the tracing become black or nearly black in color. After suitable exposure the paper is removed and thoroughly washed in water, when the tracing will be exactly reproduced, the dark parts being dark in the copy and the light parts light. After washing, the paper is dried by any suitable means and is then ready for use.

Copies obtained by this process can be filled in with colors for architects' or mechanical engineers' use or other purposes, and this is a very great advantage.

From the above description it will be seen that positive copies can be made with our paper with the minimum amount of trouble. A person of very little skill can do the work, and no special apparatus or reagents are required.

What we claim is—

1. The new article of manufacture consisting of a paper that will give a positive and direct sun-print on exposure to sunlight and subsequent development by washing with water, substantially as described.

2. The new article of manufacture consisting of paper coated or impregnated with gallic acid, a ferric salt, and a vegetable acid, for the purpose of giving a direct sun-print on exposure to sunlight and subsequent development by washing with water, substantially as described.

In testimony whereof we affix our signatures in presence of two witnesses.

JULIUS BOETTNER.
THEODORE DICKE.

Witnesses:
JULIUS SCHWENCKE,
WM. BADE.